(12) United States Patent
Deal et al.

(10) Patent No.: US 8,138,675 B2
(45) Date of Patent: Mar. 20, 2012

(54) STABILIZED EMISSIVE STRUCTURES AND METHODS OF MAKING

(75) Inventors: Andrew David Deal, Niskayuna, NY (US); William Paul Minnear, Clifton Park, NY (US); Gregory Michael Gratson, Glen Allen, VA (US); David Jeffrey Bryan, Indian Trail, NC (US)

(73) Assignee: General Electric Company, Niskayuna, NY (US)

( * ) Notice: Subject to any disclaimer, the term of this patent is extended or adjusted under 35 U.S.C. 154(b) by 330 days.

(21) Appl. No.: 12/394,490

(22) Filed: Feb. 27, 2009

(65) Prior Publication Data

US 2010/0219753 A1 Sep. 2, 2010

(51) Int. Cl.
*H01J 17/04* (2006.01)
*G21K 5/00* (2006.01)

(52) U.S. Cl. ............ 313/631; 313/311; 313/346 R; 313/355; 313/484; 250/432 R; 250/493.1

(58) Field of Classification Search .............. None
See application file for complete search history.

(56) References Cited

U.S. PATENT DOCUMENTS

| | | | |
|---|---|---|---|
| 5,079,473 A | 1/1992 | Waymouth | |
| 5,123,868 A | 6/1992 | Waymouth | |
| 5,955,839 A | 9/1999 | Jaffe et al. | |
| 6,476,409 B2 | 11/2002 | Iwasaki et al. | |
| 6,525,461 B1 | 2/2003 | Iwasaki et al. | |
| 6,586,775 B2 | 7/2003 | Hirayama | |
| 6,610,463 B1 | 8/2003 | Ohkura et al. | |
| 6,784,007 B2 | 8/2004 | Iwasaki et al. | |
| 6,855,025 B2 | 2/2005 | Iwasaki et al. | |
| 6,869,330 B2 | 3/2005 | Gee et al. | |
| 6,924,023 B2 | 8/2005 | Ohkura et al. | |
| 7,049,735 B2 | 5/2006 | Ohkubo et al. | |
| 7,075,229 B2 | 7/2006 | Lambertini et al. | |
| 7,119,337 B1 | 10/2006 | Johnson et al. | |
| 2004/0118698 A1 | 6/2004 | Lu et al. | |
| 2004/0161369 A1 | 8/2004 | Chan et al. | |
| 2004/0182847 A1 | 9/2004 | Ohkubo et al. | |
| 2004/0232837 A1 | 11/2004 | King | |
| 2004/0239228 A1 | 12/2004 | Perlo et al. | |
| 2005/0142512 A1 | 6/2005 | Perlo et al. | |
| 2005/0166837 A1 | 8/2005 | Marshall | |
| 2005/0168147 A1 | 8/2005 | Innocenti et al. | |
| 2005/0206300 A1 | 9/2005 | Perlo et al. | |
| 2005/0206306 A1 | 9/2005 | Perlo et al. | |
| 2005/0263269 A1 | 12/2005 | Kaneko et al. | |
| 2006/0001344 A1* | 1/2006 | Ohkubo et al. | ............. 313/271 |
| 2006/0076868 A1 | 4/2006 | Pullini et al. | |
| 2006/0175380 A1 | 8/2006 | Marshall | |

(Continued)

FOREIGN PATENT DOCUMENTS

| | | |
|---|---|---|
| JP | 2004158319 A | 6/2004 |
| JP | 2004259651 A | 9/2004 |
| JP | 2005302352 A | 10/2005 |
| WO | 2006034561 A1 | 4/2006 |

*Primary Examiner* — Ashok Patel
(74) *Attorney, Agent, or Firm* — Mary Louise Gioeni (57) ABSTRACT

An emitter is disclosed. The emitter includes a base layer comprising an array of nanocavities on an emission surface of the base layer, wherein facets of the nanocavities are substantially along equivalent crystallographic planes of one or more families of planes having substantially equal surface energies, wherein the equivalent crystallographic planes have surface energies equal to or lower than a surface energy of the crystallographic plane of the emission surface. Methods of making such emitters and radiation sources including such emitters are also disclosed.

24 Claims, 9 Drawing Sheets

U.S. PATENT DOCUMENTS

| | | |
|---|---|---|
| 2006/0175968 A1 | 8/2006 | Kimoto et al. |
| 2006/0177952 A1 | 8/2006 | Lambertini et al. |
| 2006/0252337 A1 | 11/2006 | Lambertini et al. |
| 2006/0281018 A1 | 12/2006 | Tomaru |
| 2007/0044540 A1 | 3/2007 | Ohkubo et al. |
| 2009/0160314 A1 | 6/2009 | Zalyubovskiy et al. |

\* cited by examiner

STABILIZED EMISSIVE STRUCTURES AND METHODS OF MAKING

BACKGROUND

The presently claimed invention relates to emissive structures and related systems.

Conventional tungsten filament lamps exhibit low luminous efficacy (~17 lm/W for a 120 V, 750 h, 100 W lamp) compared to plasma discharge or fluorescent lighting sources. In tungsten incandescent lamps only 5-10% of radiation is emitted in the visible spectral range (390-750 nanometers), while most is emitted in the IR spectrum and is lost as heat. The rest is emitted as thermal infrared radiation, primarily in the 750-4000 nanometers spectral range. The efficiency of the incandescent lamp can be improved by simultaneous enhancement of the visible radiation emitted and suppression of the infrared radiation emitted.

Photonic lattices have been proposed as a means to prevent IR loss. These structures, in one example, are simply a periodic arrangement of two materials with different dielectric constants, e.g. tungsten and air. Periodic photonic lattices have a unique property: radiation of specific wavelengths cannot propagate through the lattice. Enhanced efficiency in visible wavelengths can be achieved if the photonic lattice is configured to increase visible absorption and/or suppress IR emission. Unfortunately, many of the photonic lattices are limited to low temperature operation (less than 1000 degrees K) due to thermal instabilities.

Therefore, it would be advantageous to develop stabilized high temperature emitters with tailored emission properties.

BRIEF DESCRIPTION

In accordance with one aspect of the disclosure, an emitter is disclosed. The emitter includes a base layer comprising an array of nanocavities on an emission surface of the base layer, wherein facets of the nanocavities are substantially along equivalent crystallographic planes of one or more families of planes having substantially equal surface energies, wherein the equivalent crystallographic planes have surface energies equal to or lower than a surface energy of the crystallographic plane of the emission surface.

In accordance with another aspect of the disclosure, a method of making an emitter is disclosed. The method includes forming a base layer and forming an array of faceted nanocavities on an emission surface of the base layer, wherein facets of the nanocavities are substantially along equivalent crystallographic planes of one or more families of planes having substantially equal surface energies, wherein the equivalent crystallographic planes have surface energies substantially equal to or lower than a surface energy of the plane of the emission surface.

In accordance with yet another aspect of the disclosure, a radiation source is disclosed. The radiation source includes a base, a light-transmissive envelope coupled to the base, an emitter disposed within the light-transmissive envelope, wherein the emitter includes a base layer comprising an array of faceted nanocavities on an emission surface of the base layer, wherein facets of the nanocavities are substantially along equivalent crystallographic planes of one or more families of planes having substantially equal surface energies, wherein the equivalent crystallographic planes have surface energies equal to or lower than a surface energy of the crystallographic plane of the emission surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with one or more embodiments of the presently claimed invention, radiation emitters, radiation sources, and associated methods will be described herein. In the following description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Furthermore, various operations may be described as multiple discrete steps performed in a manner that is helpful for understanding embodiments of the present invention. However, the order of description should not be construed so as to imply that these operations need be performed in the order they are presented, or that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous and interpreted as open ended unless otherwise indicated.

Embodiments of the present invention include emitter structures that enable increased photonic lattice survival at higher temperatures than previously achieved. The emitter includes photonic nanocavities (i.e., cavities having dimensions on the sub-micron length scale), formed such that that the cavities maintain a more stable, faceted shape at steady state operating conditions. To enable such stabilized cavity facets, the facets are configured to be substantially along equivalent crystallographic planes of one or more families of planes having substantially equal surface energies. Further, the equivalent crystallographic planes of the one or more families have surface energies substantially equal to or lower than a surface energy of the crystallographic plane of the emission surface. In some embodiments, the planes of the facets of the nanocavities are from a single family of planes.

As used herein, the term "substantially equal surface energies" refers to a difference of less than or equal to about 30%. In one embodiment, "substantially equal surface energies" refers to a difference of less than or equal to about 20%. In a further embodiment, "substantially equal surface energies" refers to a difference of less than or equal to about 10%.

As used herein, the term "substantially along equivalent crystallographic planes" refers to a plane within 15 degrees of the crystallographic plane. In one embodiment, "substantially along equivalent crystallographic planes" refers to a plane within 10 degrees of the crystallographic plane. In a further embodiment, "substantially along equivalent crystallographic planes" refers to a plane within 5 degrees of the crystallographic plane.

As used herein, the term "surface energy" refers also in the alternative to interfacial surface energy when the referred to surface is in the presence of another medium, such as a gaseous medium.

Planes that are related to each other by symmetry form a family of planes, typically denoted by {hkl}(or {hkil} for a four axes co-ordinate system).

At high temperatures, various physical processes such as surface diffusion, volume diffusion, and curvature effects, among other processes, act to distort and collapse cavities. The absolute minimum surface energy configuration (and thereby the most stable) for a system is a flat surface consisting of the lowest energy plane for the system, but photonic cavities are structured surfaces and can thus be considered metastable configurations relative to the flat surface. To enable increased stability of the structured photonic cavities one embodiment of present invention provides an arrangement of photonic nanocavities with minimum surface area consistent with the desired photonic properties and with facet planes having low, but not necessarily the lowest, surface energies for that material. Higher energy configurations, while possible, would be predicted to be less persistent than the lower energy ones.

In one embodiment of the present invention, the nanocavities are facet-stabilized to a temperature of at least about 1500 degree Kelvin. As used herein, the term "facet stabilized," in context of nanocavities, refers to the increased persistence of certain faceted nanocavities as compared to un-faceted nanocavities. In a further embodiment of the present invention, the nanocavities are facet-stabilized to a temperature of at least about 2000 degree Kelvin. In a still further embodiment of the present invention, the nanocavities are facet-stabilized to a temperature of at least about 2300 degree Kelvin. In another embodiment, the nanocavities are facet stabilized up to temperatures of about 2300 degree Kelvin. In yet another embodiment, the nanocavities are facet stabilized up to temperatures of about 2500 degree Kelvin.

In one embodiment, the equivalent crystallographic planes of the one or more families of planes, and the plane of the emission surface, comprise a group of lowest energy planes for a material of the base layer. In a non-limiting example, these planes together form a cusp in the distribution of surface energies of the planes for the crystal system of the material of the base layer.

The base layer, in some embodiments, may have a single crystal surface. In some alternate embodiments, the base layer may have a polycrystalline surface including the emission surface with the nanocavities. In other embodiments, the base layer may comprise of multiple phases. The emission surface is along a crystallographic plane having a surface energy substantially equal to or greater than the surface energy of the planes of the facets of the nanocavities for each phase of the base layer.

In one embodiment, an emission structure including facet stabilized nanocavities is enabled by the use of a base layer material having a highly anisotropic surface energy distribution in the phase(s) of the base layer material. In certain embodiments, the plane of the emission surface and the planes of the facets of the nanocavities have surface energies substantially less than the bulk of the planes of the crystal system(s) of the material of the base layer.

Base layers may include refractory materials. Such refractory materials include, but are not limited to, transition metals or compounds of transition metals. Examples of compounds of transition metals include oxides, nitrides, carbides, borides and combinations thereof. Some specific examples of base layer materials include WC (tungsten carbide), $W_2C$ (bi-tungsten carbide), HfN (hafnium nitride), hafnium carbonitride, hafnium oxynitride, hafnium oxycarbonitride or combinations thereof.

In one embodiment, the base layer may comprise a chemistry to promote a certain phase or phases, e.g. $W_2C$, but with additional elements (known in the art as soluble elements) in the phase(s) that may alter the surface energy distribution of the crystal planes comprising the facets of the nanocavities and/or the emission surface to improve persistence of the nanocavities relative to a base layer of the same chemistry without the soluble elements. In one embodiment, such additions of soluble elements may lead to a different set of low energy planes for a given material system, and which will form the facet wall and/or the emission surface. For example, for a $W_2C$ base layer material, suitable soluble elements include but are not limited to tantalum, molybdenum, transition metals such as titanium, and light elements such as nitrogen.

A form of $W_2C$ has a trigonal crystal system. In one embodiment, the base layer includes tungsten carbide $W_2C$ and the emission surface is oriented substantially along the (001) plane of $W_2C$ and the facets of the nanocavities are substantially along planes from the {11-20} family of planes. In one embodiment, the {11-20} family of planes along with the (0001) plane of the emission surface, form the lowest energy planes for the trigonal crystal system of $W_2C$. In one embodiment, the facets of the nanocavities form hexagonal or near-hexagonal cavities. A near-hexagonal cavity refers to a six-sided cavity with unequal cavity sides.

In a non-limiting example, and in accordance with one embodiment of the present invention, the base layer includes HfN (hafnium nitride). HfN has a face center cubic crystal system. In one embodiment of a HfN base layer, the emission surface is substantially along the (111) plane and the facets of the cavities are substantially along the {111} family of planes. In an exemplary embodiment, the facets of the nanocavities form pyramidal or near pyramidal cavities (with unequal cavity sides).

In a further embodiment the base layer comprises hafnium carbonitride. In a still further embodiment, the hafnium nitride or hafnium carbonitride base layer further comprises soluble elements.

In some embodiments, the array of nanocavities is a periodic two dimensional array arranged, for example as a simple square lattice or a hexagonal lattice. In some other embodiments, the array of nanocavities may comprise a random lattice. The nanocavities may have varied geometry and dimensions. In certain embodiments, the geometry of the nanocavities is hexagonal or pyramidal. In some embodiments the facets are perpendicular to the plane of the emission surface. In other embodiments the facets are angled to the plane of the emission surface.

The average lattice spacing of the nanocavities, in some embodiments, is in a range from about 400 nanometers to about 600 nanometers. In one embodiment, a nominal nanocavity cross-sectional dimension (width) is in a range from about 200 nanometers to about 300 nanometers. In certain embodiments a nominal nanocavity depth is in a range from about 400 nanometers to about 600 nanometers.

Figure 1:
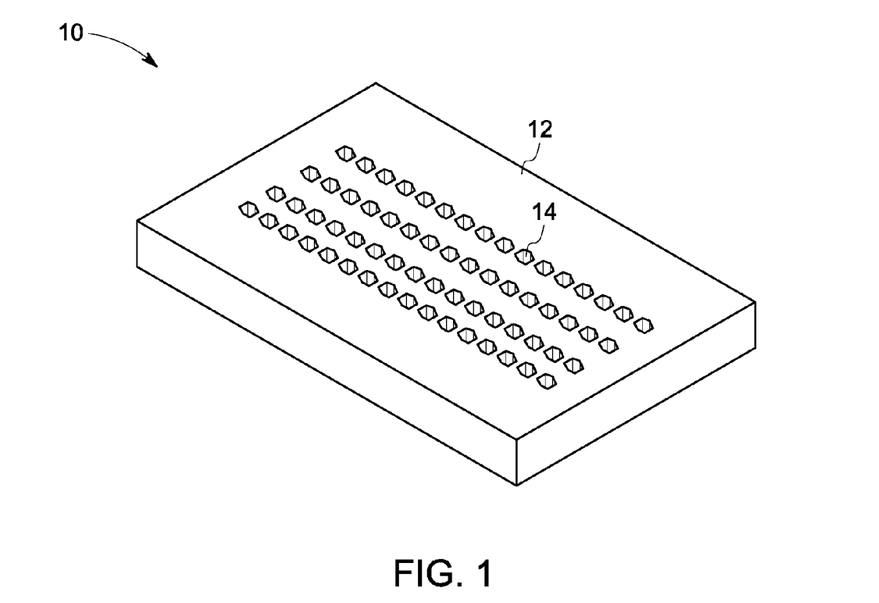
FIG. 1 illustrates a schematic top view of an emitter including a base layer with a patterned area of nanocavities in accordance with one embodiment of the present invention.
Figure 2:
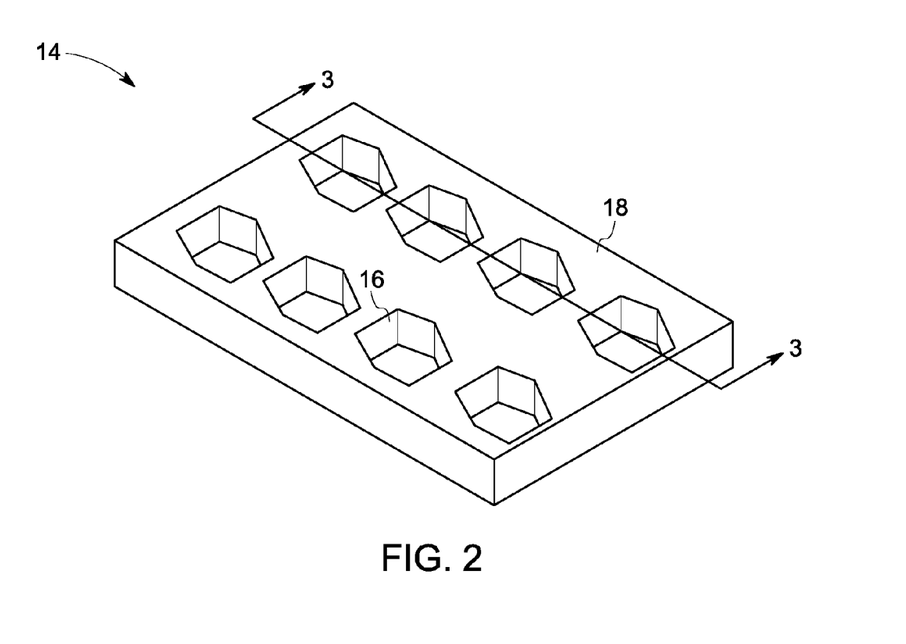
FIG. 2 illustrates schematic perspective view of the patterned area of the emitter of FIG. 1 in accordance with one embodiment of the present invention.

FIG. 1 illustrates a schematic top view of an emitter 10 including a base layer 12 with a patterned area 14 of nanocavities in accordance with one embodiment of the present invention. FIG. 2 is a detailed view of the patterned area 14 including nanocavities 16 with the cavity opening along an emission surface 18. In a non-limiting example a base layer made of tungsten subcarbide ($W_2C$), the emission surface is formed along the basal plane.

Figure 3:
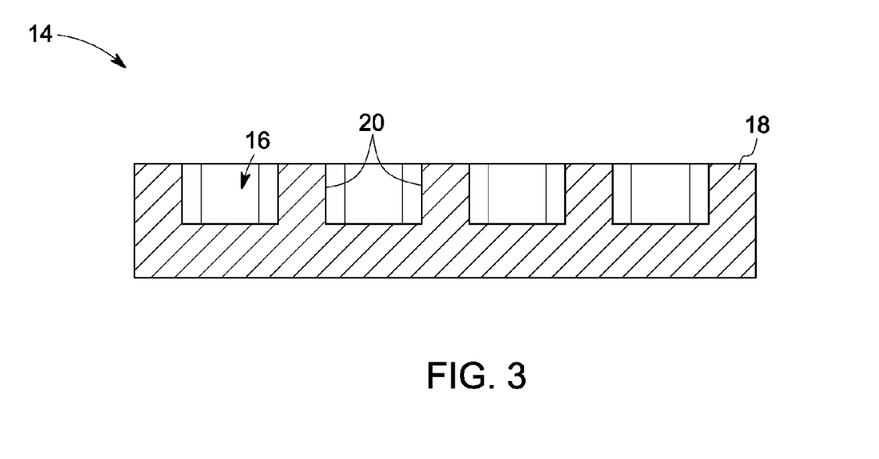
FIG. 3 illustrates schematic cross-sectional view of the patterned area of the emitter of FIG. 1 in accordance with one embodiment of the present invention.

FIG. 3 illustrates a schematic cross-sectional view of the patterned area of the emitter of FIG. 1 in accordance with one embodiment of the present invention. A sectional view of the nanocavities is shown in FIG. 3. The facets 20 of the nanocavities 16 lie substantially along equivalent crystallographic planes of one or more families of planes having substantially equal surface energies. The facets 20 of the nanocavities 16 have surface energies equal to or lower than a surface energy of the crystallographic plane of the emission surface. In the illustrated embodiment, the nanocavities are shown to have a planar cavity base and substantially perpendicular facets, such as in a hexagonal cavity. In alternate embodiments, the nanocavities may have, for example, pyramidal shapes with angular facets.

Figure 4:
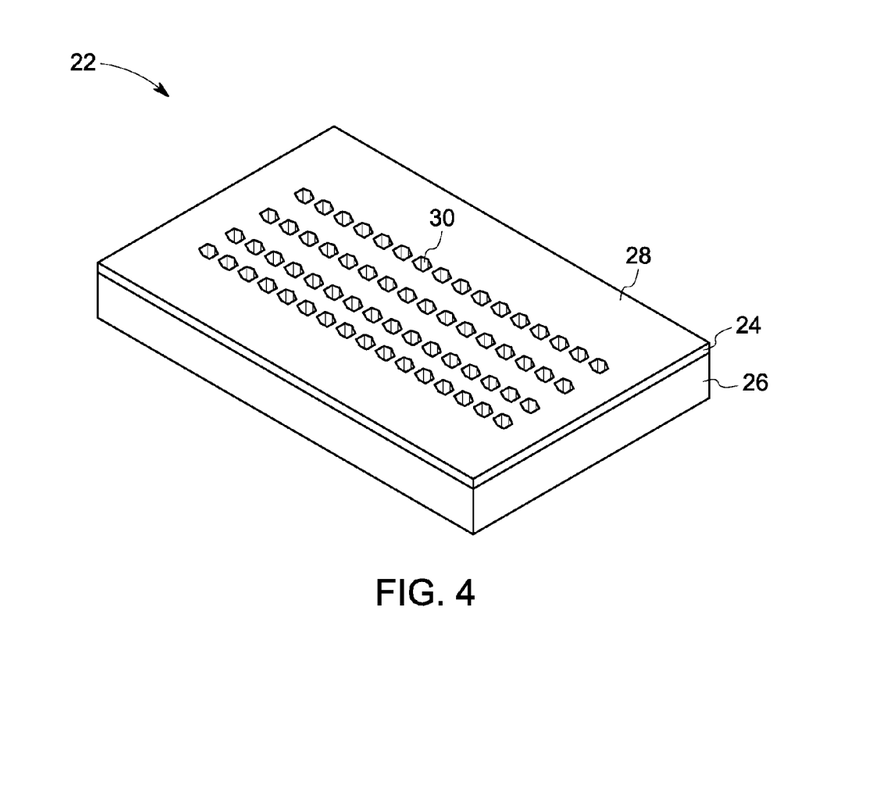
FIG. 4 illustrates a schematic top view of an emitter including a base layer with a patterned area of nanocavities and further including a support in accordance with one embodiment of the present invention.

FIG. 4 illustrates a schematic top view of an emitter including a base layer with a patterned area of nanocavities and further including a support in accordance with one embodiment of the present invention. In a further embodiment, an emitter 22 may also include a base layer 24 disposed over a substrate layer 26. The base layer 24 has a surface 28 and the nanocavities 30 are patterned in an area of the base layer 24. The nanocavities 30 have facets 31 aligned substantially perpendicular to the surface of the base layer 24.

The following example is included to provide additional guidance to those skilled in the art in practicing the claimed invention. The example provided is merely representative of the work that contributes to the teaching of the present application. Accordingly, the example is not intended to limit the invention, as defined in the appended claims, in any manner.

EXAMPLE

A piece of rolled tungsten (W) sample, about 1 cm×1 cm with a thickness of about 0.1 cm, was thermally annealed at about 2073 degree Kelvin for about 5 hours. The annealing process may aid in the reduction or removal of plastic strain induced by the rolling process and to help stabilize the grain size and crystallographic texture. The surface characterization Electron Backscatter Diffraction (EBSD) technique was employed to determine the grain size (about 15 micron) and texture of the sample.

Figure 5:
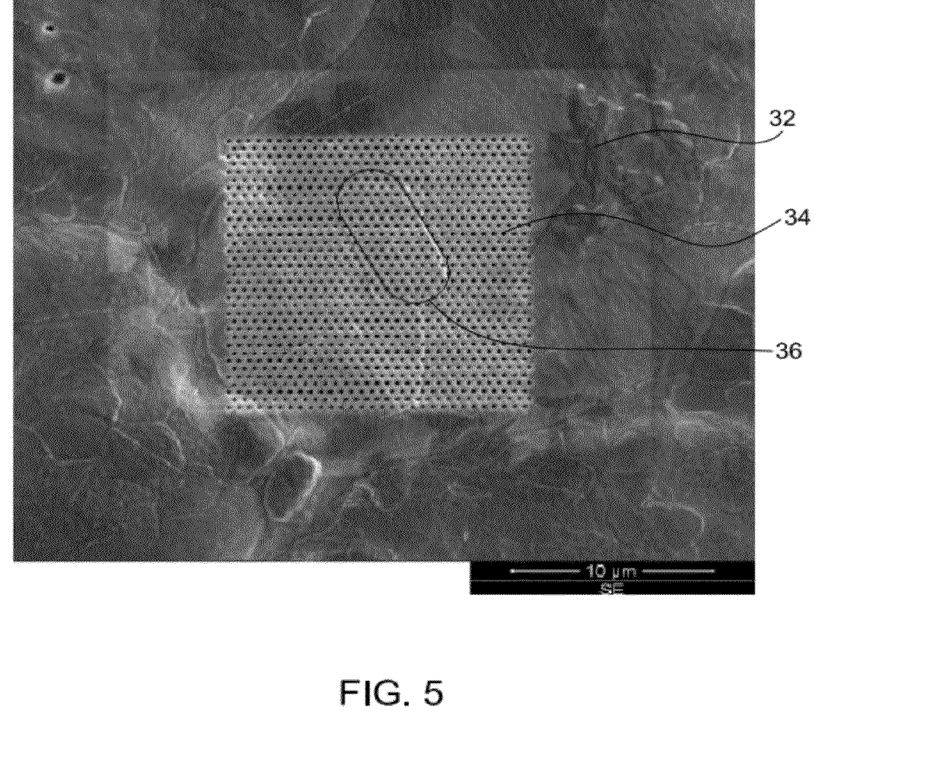
FIG. 5 is a scanning electron microscope (SEM) micrograph of an emitter sample including a base layer, wherein the base layer includes an area patterned using focused ion beam (FIB) technique in one embodiment of the present invention.

Next, the sample was exposed to several carburizing and decarburizing steps at temperatures ranging from about 1873 degree Kelvin to about 2073 degree Kelvin, but the W grain boundaries, grooved by the annealing step, remained almost completely unchanged. Carburization at 1873 degree Kelvin converted the W surface to $W_2C$ (tungsten subcarbide), with some areas converting to WC (tungsten carbide), as confirmed by EBSD. The grain size of the converted phases was of the order of 7 microns. Following this, a $W_2C$ grain having a nearly basal plane (0001) surface orientation was selected, and a 15×15 $\mu m^2$ area that included this grain was patterned with a Focused Ion Beam (FIB) to form an array of cavities. This placed the {10-10} and {11-20} families of planes of the $W_2C$ grain substantially perpendicular to the surface. The array of cavities had diameters of about 250 nanometers, depths of about 500 nanometers, and pitches of about 500 nanometers, as seen in the scanning electron microscope (SEM) micrograph (FIG. 5). FIG. 5 shows the sample 32 with the array 34 and the nearly basal plane grain 36.

Figure 6:
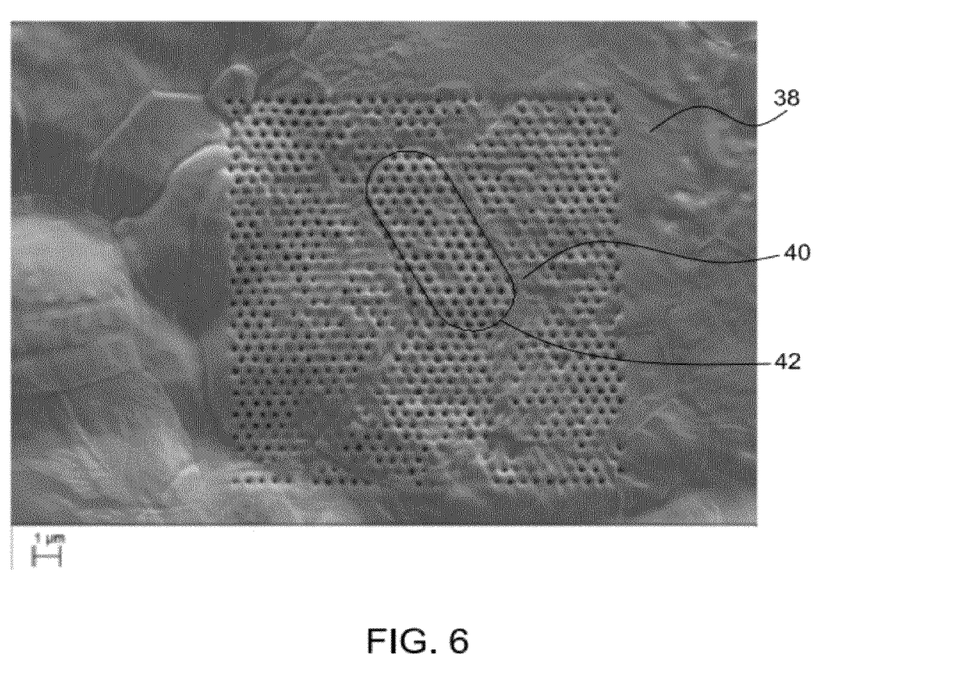
FIG. 6 is an SEM micrograph of the emitter sample of FIG. 16, wherein the base layer has been heated to a temperature of 2073 degree F. in a carburizing atmosphere and held at that temperature for 30 minutes and cooled, in one embodiment of the present invention.
Figure 7:
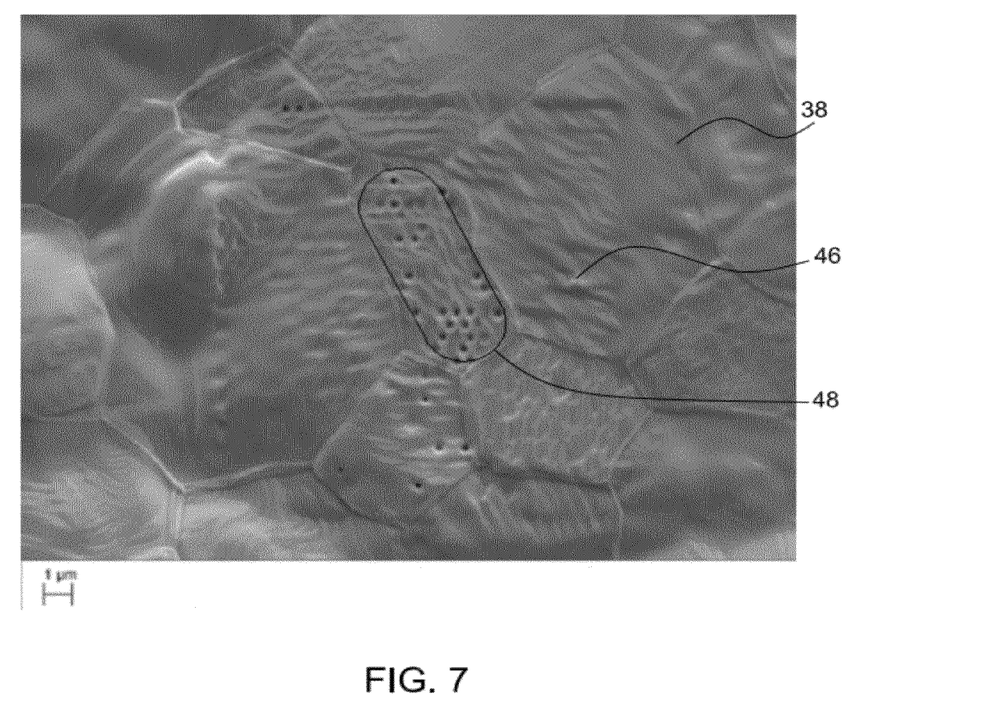
FIG. 7 is an SEM micrograph of the emitter sample of FIG. 17, wherein the base layer has been further heated to a temperature of 2173 degree F. in a carburizing atmosphere and held at that temperature for 30 minutes and cooled, in one embodiment of the present invention.

Once the array was created with the FIB, the sample was heated to about 2073 degree Kelvin in a carburizing atmosphere, held at that temperature for 30 minutes, and then cooled. A SEM image was taken of the patterned area (FIG. 6). FIG. 6 shows sample 38 with the array of nanocavities 40 and the nearly basal plane grain 42, post the above processing steps. Then, the sample was heated to about 2173 degree Kelvin in a carburizing atmosphere, and was held at that temperature for 30 minutes, and then cooled. Again, a SEM image was taken (FIG. 7). FIG. 7 illustrates the sample 44 with the array 46 and the nearly basal plane grain 48, after the above processing steps.

Comparing the SEM image of FIG. 7 with the SEM image of FIG. 5, it is evident that the holes having the {10-10} and {11-20} planes nearly normal to the surface preferentially survived. The holes, which were round prior to the temperature exposure, appeared to develop faceted sides, creating a near-hexagonal shape. These sides appeared to be near-parallel to the {11-20} family of planes upon a top-down EBSD inspection.

This example illustrates that stability in $W_2C$ grains is affected by the crystallographic orientation of the grains. Specifically, a polycrystalline $W_2C$ surface with a (0001) fiber texture or a single crystal $W_2C$ surface with a (0001) surface will provide additional stability to a patterned photonic lattice.

Although the illustrated example discusses only nanocavities formed along a basal plane of $W_2C$, the same principles of faceted stability are believed to be equally applicable to other material systems with anisotropic surface energy. Although the Applicants would not like to be bound by any particular theory, it is believed that cavity geometry may vary depending upon the organization of the planes. In one embodiment, construction of such a surface might be achieved through conventional single crystal growth techniques or polycrystalline thermomechanical processing.

A further embodiment includes a method for making emitter structures. The method includes forming a base layer and forming an array of faceted nanocavities on an emission surface of the base layer. The facets of the nanocavities are substantially along equivalent crystallographic planes of one or more families of planes having substantially equal surface energies, and the equivalent crystallographic planes have surface energies substantially equal to or lower than a surface energy of the plane of the emission surface.

In one embodiment the stabilized facets of the nanocavities are directly formed during the formation of the nanocavities. Alternatively, the stabilized facets of the nanocavities are formed subsequent to a heat treatment process wherein the originally created facets of the nanocavities are rearranged along low energy planes of the crystal.

In one embodiment, nanocavities are formed using techniques such as but not limited to drilling, etching, ion milling, FIB techniques, or combinations thereof. In one example, etching techniques can be used to preferentially etch away higher surface energy planes to reveal lower surface energy planes. In a further embodiment, the nanocavities form stabilized facets upon heat treatment. In a non-limiting example, crystallographic planes will form stabilized facets at high temperatures such as greater than 2000 degree Kelvin and stabilize the walls of the cavities.

In a further embodiment, the base layer may be subjected to heat treatment steps such as annealing. In one embodiment, the annealing step helps control destabilization of a nanocavity pattern created in the base layer.

The step of forming the base layer may include, in some embodiments, the carburization of a source material layer. For example, a $W_2C$ base layer may be formed by carburization of a source material tungsten layer at about 1873 degree Kelvin. In some embodiments, carburization may occur at temperatures greater than about 2000 degree Kelvin. In some examples, carburization may be followed by treatment at temperatures greater than about 2073 degree Kelvin. In some examples, carburization may be preceded by a step of annealing the source material layer to stabilize the layer. Following carburization, nanocavities may be formed in the layer.

Figure 8:
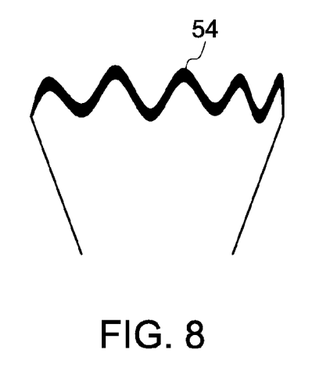
FIGS. 8-12 illustrate examples of emitter filaments in accordance with embodiments of the present invention.
Figure 9:
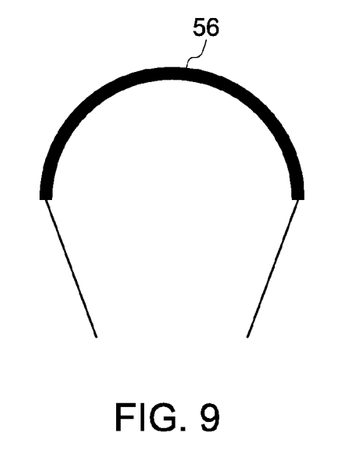
Figure 10:
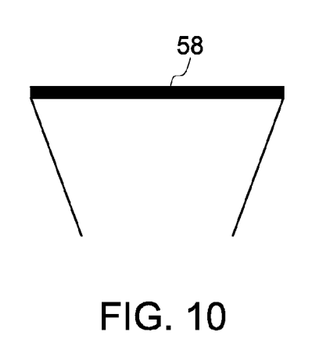
Figure 11:
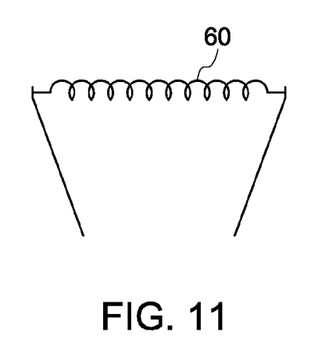

In some embodiments, the emitter includes a support element or a substrate. In one example, the base layer or coating is disposed over the support element or substrate. The emitter may be formed in various shapes and structures such as but not limited to a planar structure or a coiled structure. Non-limiting examples of various emitters are illustrated in FIGS. 7 though 11. The emitters depicted in FIGS. 7 through 11 are intended to be illustrative and not limiting. In one example, the emitter may be a planar ribbon element 54 as shown in FIG. 7. The emitter of FIG. 8 is a curved element 56. In another example, the emitter may be a planar structure 58 as shown in FIG. 9. The emitter illustrated in FIG. 10 represents a coiled element 60 which may be formed in a coiled-coil arrangement. In a further example, the emitter may be a planar annular element 62 as shown in FIG. 11.

In one embodiment, the emitter may be made optically active through heat treatment. In one example, the emitter may include a substrate, for example of tungsten, which may be heated. In another example the emitter may be heated to a point where it conducts electricity at which point it can be resistively heated.

The emitters described herein may find further use in various radiation sources. In one embodiment, a radiation source may include a base, a light-transmissive envelope coupled to the base, and a radiation emitter. The emitter includes a base layer having an array of nanocavities. As described above, the facets of the nanocavities are substantially along equivalent crystallographic planes of one or more families of planes having substantially equal surface energies, and the equivalent crystallographic planes have surface energies equal to or lower than a surface energy of the plane of the emission surface.

Figure 12:
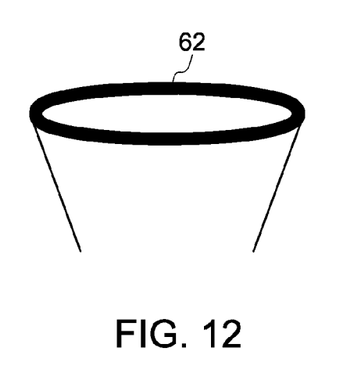

FIG. 12 illustrates a radiation source such as an incandescent lamp including the radiation emitter in accordance with one embodiment of the present invention. As illustrated in FIG. 12, incandescent lamp 80 may include a base 86, a light-transmissive envelope 82, an emitter structure 84 disposed within the light transmissive envelope 82, and a base 86 to which the light transmissive envelope 82 is coupled. The base 86 is where the electrical contact for the lamp is made and as such, may be fabricated out of any conductive material such as brass or aluminum. The light-transmissive envelope 82 may be fabricated out of glass and may take on any of a wide variety of shapes and finishes.

The emitter structure 84 may be coupled to the base 86 and may include a stem press 88 lead wires 90, and support wires 94. The emitter structure 84 may further include an emitter 92 coupled to the base 86. The lead wires 90 carry the current from the base 86 to the emitter 92. The lead wires 90 may be made of copper from the base 86 to the stem press 88 and may be made of nickel or nickel-plated copper from the stem press 88 to the emitter 92. The stem press 88 may be a glass-based structure that holds the radiation emitter 84 in place. The stem press 88 may include an airtight seal around the lead wires 86. In order to balance the coefficients of expansion, the stem press 88 may further include a copper sleeve through which the lead wires 90 are passed. The support wires 94 are used to support the emitter 92 and may be made from molybdenum, for example.

Figure 13:
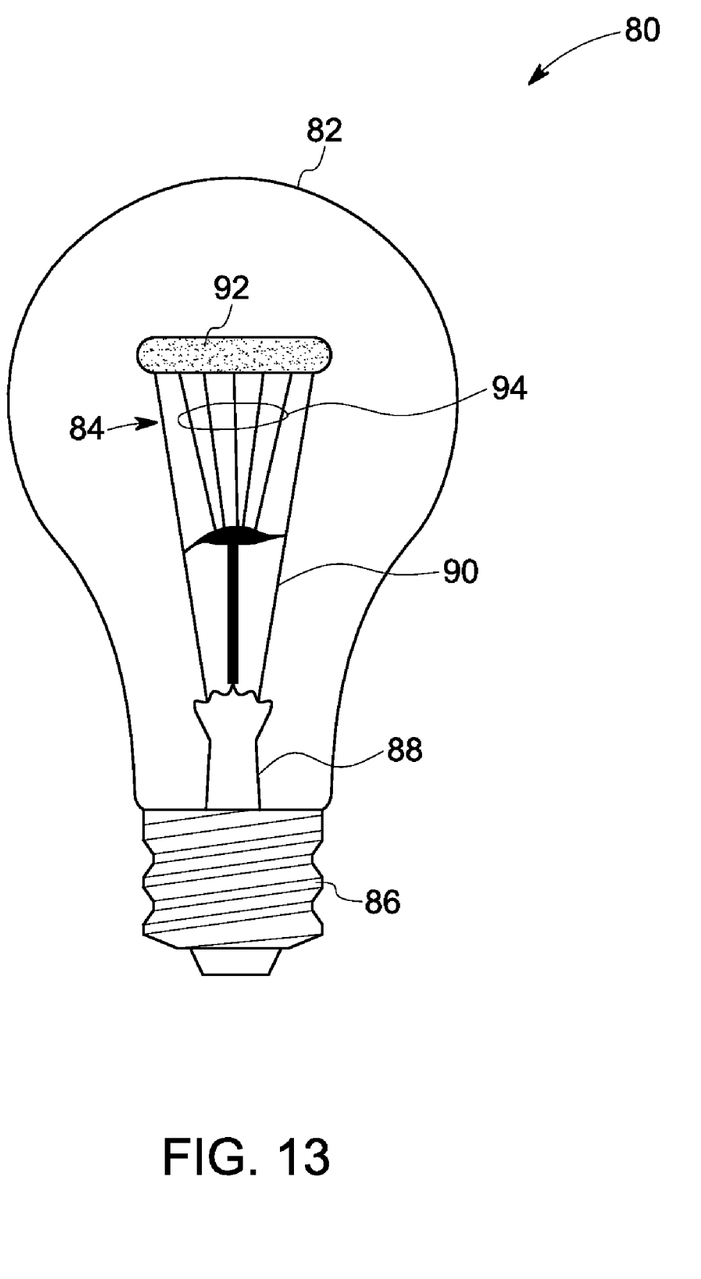
FIG. 13 illustrates an incandescent lamp including an emitter in accordance with one embodiment of the present invention.

In the embodiment illustrated in FIG. 13, the incandescent lamp 96 is substantially similar to the incandescent lamp 80 of FIG. 12. However, the emitter structure 84 of the incandescent lamp 96 includes an emitter 92 that in turn includes a stabilized base layer element or coating 100 disposed over a core substrate 98. Emitters may have various structures as described above. For example, the emitter may be a coiled element or a planar element. In one non-limiting example, the element may be a double-coiled element including core 98 with the base layer 100.

Figure 14:
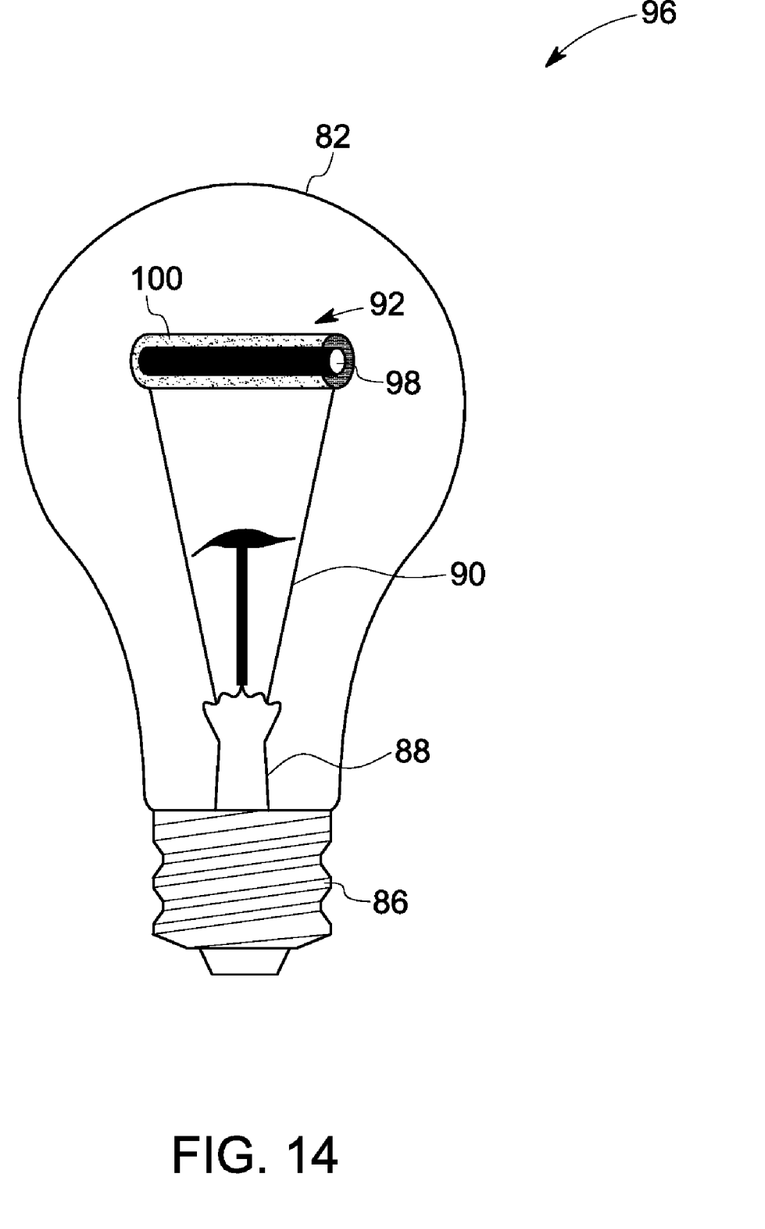
FIG. 14 illustrates an incandescent lamp including an emitter in accordance with another embodiment of the present invention.
Figure 15:
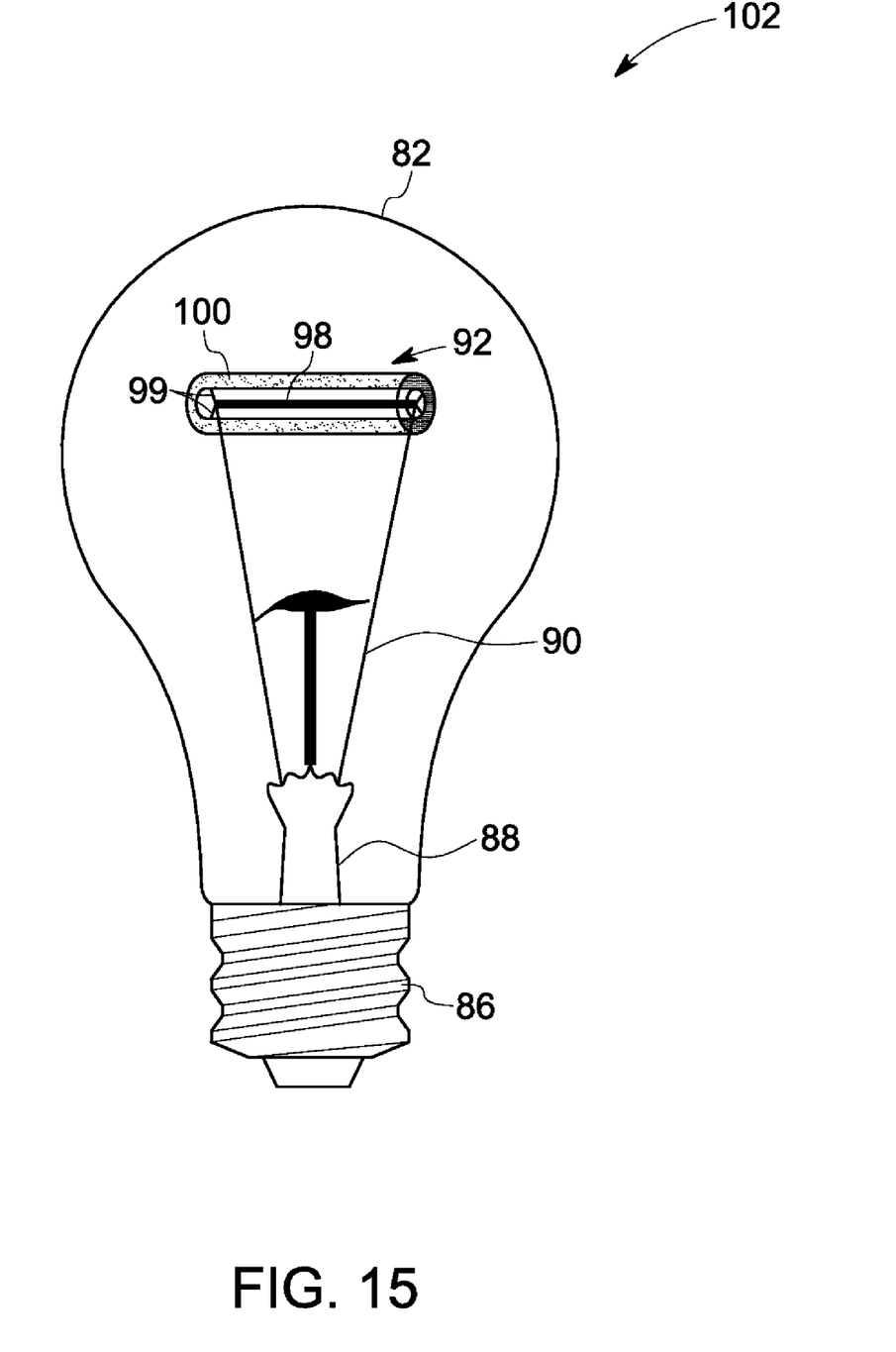
FIG. 15 illustrates an incandescent lamp including an emitter in accordance with another embodiment of the present invention.

In another non-limiting example, an emitter 92 includes a stabilized base layer element with no direct electrical contact with the core forming a filament. The base layer element may be mechanically supported by the core but not electrically connected to it. The base layer element may therefore be indirectly heated by the radiation from the core to in turn emit radiation. FIG. 14 illustrates one such embodiment 102, where the base layer element is not in direct with the core 98. In the illustrated example, the emitter 100 is supported by insulating supports 99.

In one embodiment, the nanocavities in the emitter prevent the propagation of infrared radiation from the emitter, increasing the radiation efficiency of light in the visible spectrum. In a non-limiting example, the emitter exhibits selective emission in a range from about 390 nanometers to 750 nanometers. In a further example, the emitter selectively suppresses radiation in a range from about 750 nanometers to about 2500 nanometers.

In a further embodiment, a gas filling may be disposed within the light transmissive envelope. Non-limiting examples of such gas fillings include noble gases such as but not limited to argon, krypton and gases such as nitrogen. In one example the gas filling may include 95% argon and 5% nitrogen.

In one embodiment, the gas filling may be chosen to be non-reactive to the emitter material. In another embodiment, the gas filling may be chosen, such that thermodynamic equilibrium is achieved during operation between the gas filling and the material of the emitter. In still another embodiment, a gas fill is chosen so as to maintain a constant composition at the emitter surface at the temperature of operation, for example at 2000 degrees K. In a further embodiment, a gas fill may chosen so as to lower the interface energy of the emission surface and lower the interface energy of the facets of the nanocavities.

The emission quality of radiation sources may be characterized by parameters such as color rendition index (CRI) and color temperature. CRI is a measure of the ability of a light source to reproduce the colors of various objects being lit by the source. In various embodiments including the emitter described herein, the color rendition index (CRI) of the radiation source is typically in a range from about 60 to about 100. In some embodiments, the CRI is greater than 75. In some further embodiment, the radiation source has a CRI greater than about 80 during operation. In still further embodiments, the CRI is greater than 90.

Color temperature of a radiation source is determined by comparing the color of the source with a theoretical, heated black-body radiator. In some embodiments of the radiation source including the emitter described herein, the color temperature of the radiation source is greater than about 2000 degrees K. In some further embodiments, the color temperature of the radiation sources is greater than 2500 degrees K.

Without further elaboration, it is believed that one skilled in the art can, using the description herein, utilize the present invention to its fullest extent. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An emitter comprising:
    a crystalline base layer material comprising an emission surface along a crystallographic plane of the material; and
    an array of nanocavities on the emission surface,
        wherein the nanocavities have a plurality of facets;
        wherein the plurality of facets are substantially along equivalent crystallographic planes of one or more families of planes of the material having substantially equal surface energies; and
        wherein the substantially equal surface energies are equal to or lower than a surface energy of the crystallographic plane of the emission surface.

2. The emitter of claim 1, wherein the equivalent crystallographic planes of the one or more families of planes and the crystallographic plane of the emission surface comprise a group of lowest energy planes for the material of the base layer.

3. The emitter of claim 1, wherein the facets of the nanocavities are substantially along equivalent crystallographic planes of a family of planes.

4. The emitter of claim 1, wherein the base layer material comprises a polycrystalline surface including the crystallographic plane of the emission surface.

5. The emitter of claim 1, wherein the base layer material comprises a highly anisotropic distribution of surface energies.

6. The emitter of claim 1, wherein the base layer material comprises a refractory material.

7. The emitter of claim 6, wherein the refractory material comprises a compound of a transition metal.

8. The emitter of claim 7, wherein the compound is at least one selected from the group consisting of oxides, nitrides, carbides, borides and combinations thereof.

9. The emitter of claim 7, wherein the refractory material further comprises soluble elements dissolved in the compound.

10. The emitter of claim 1, wherein the base layer material comprises WC, $W_2C$, HfN, or combinations thereof.

11. The emitter of claim 1, wherein the base layer material comprises $W_2C$ and wherein the emission surface is substantially along the (0001) plane.

12. The emitter of claim 11, wherein the facets of the nanocavities are substantially along planes from the {11-20} family of planes.

13. The emitter of claim 1, wherein the base layer material comprises HfN, wherein the emission surface is substantially along the (111) plane, and wherein the facets of the cavities are substantially along the {111} family of planes.

14. The emitter of claim 1, wherein the nanocavities have a hexagonal or near-hexagonal geometry.

15. The emitter of claim 1, wherein the emitter selectively suppresses radiation in a range from about 750 nanometers to about 2500 nanometers.

16. The emitter of claim 1, wherein an average lattice spacing of the nanocavities in the array is in a range from about 400 nanometers to about 600 nanometers.

17. The emitter of claim 1, wherein an average nanocavity cross-sectional dimension is in a range from about 200 nanometers to 300 nanometers.

18. The emitter of claim 1, wherein an average nanocavity depth is in a range from about 200 nanometers to about 600 nanometers.

19. The emitter of claim 1, wherein the emitter exhibits selective emission in a range from about 390 nanometers to about 750 nanometers.

20. The emitter of claim 1, further comprising a support element, wherein the base layer is disposed over the support element.

21. The emitter of claim 20, wherein the support element comprises a planar or a coiled structure.

22. A radiation source comprising:
    a base;
    a light-transmissive envelope coupled to the base; and
    an emitter disposed within the light-transmissive envelope, wherein the emitter comprises
    a crystalline base layer material comprising an emission surface along a crystallographic plane of the material; and
    an array of nanocavities on the emission surface,
        wherein the nanocavities have a plurality of facets;
        wherein the plurality of facets are substantially along equivalent crystallographic planes of one or more families of planes of the material having substantially equal surface energies; and
        wherein the substantially equal surface energies are equal to or lower than a surface energy of the crystallographic plane of the emission surface.

23. The radiation source of claim 22, further comprising a gaseous medium disposed within the envelope and in contact with the emitter.

24. An emitter comprising:
    a crystalline base layer material comprising WC, W2C, HfN, or combinations thereof;
    an emission surface along a crystallographic plane of the material; and
    an array of nanocavities on the emission surface,
        wherein the nanocavities have a plurality of facets;
        wherein the plurality of facets are substantially along equivalent crystallographic planes of one or more family of planes of the material having substantially equal surface energies; and
        wherein the substantially equal surface energies are equal to or lower than a surface energy of the crystallographic plane of the emission surface.

* * * * *